United States Patent [19]

Takamura et al.

[11] Patent Number: 5,613,170
[45] Date of Patent: Mar. 18, 1997

[54] CAMERA WITH NOVEL EXPOSURE FRAME

[75] Inventors: Masashi Takamura, Tokyo; Akio Ohmiya, Saitama-ken, both of Japan

[73] Assignees: Fuji Photo Optical Co., Ltd., Saitama-ken; Fuji Photo Film Co., Ltd., Kanagawa-ken, both of Japan

[21] Appl. No.: 704,255

[22] Filed: Aug. 28, 1996

Related U.S. Application Data

[63] Continuation of Ser. No. 497,911, Jul. 3, 1995, abandoned, which is a continuation of Ser. No. 218,378, Mar. 28, 1994, abandoned.

[30] Foreign Application Priority Data

Mar. 26, 1993 [JP] Japan ................... 5-092331
Mar. 26, 1993 [JP] Japan ................... 5-092332

[51] Int. Cl.⁶ ............................................ G03B 17/02
[52] U.S. Cl. ................................. 396/435; 396/535
[58] Field of Search ............................. 396/435, 436, 396/535, 348

[56] References Cited

U.S. PATENT DOCUMENTS

| | | | |
|---|---|---|---|
| 4,264,172 | 4/1981 | Miyagawa et al. | 354/187 |
| 4,384,774 | 5/1983 | Tuck | 354/159 |
| 4,611,895 | 9/1986 | Seey | 354/21 |
| 5,066,971 | 11/1991 | Kodaira | 354/465 |
| 5,086,311 | 2/1992 | Naka et al. | 354/195.1 |
| 5,140,354 | 8/1992 | Bornham | 354/203 |
| 5,198,932 | 3/1993 | Takamura | 359/694 |
| 5,255,033 | 10/1993 | Dassero | 354/149.11 |
| 5,298,929 | 3/1994 | Tsunefuji et al. | 354/159 |
| 5,305,051 | 4/1994 | Irie et al. | 354/441 |
| 5,325,140 | 6/1994 | Torikoshi et al. | 354/159 |
| 5,357,296 | 10/1994 | Kato | 354/76 |
| 5,436,685 | 7/1995 | Yamashina | 354/202 |

FOREIGN PATENT DOCUMENTS

| | | |
|---|---|---|
| 377930 | 4/1991 | Japan . |
| 4287035 | 10/1992 | Japan . |
| 572655 | 3/1993 | Japan . |

*Primary Examiner*—Safet Metjahic
*Assistant Examiner*—Nicholas T. Tuccillo
*Attorney, Agent, or Firm*—Young & Thompson

[57] ABSTRACT

A photographic camera having an exposure frame at the rear end of a lens barrel. A camera body is molded integrally with the lens barrel. Flanks are formed by a pair of vertical surfaces lying in planes parallel to the optical axis on inner surfaces of the frame receiving surface at locations that define four corners of an exposure aperture so as to extend radially outward from the inner surface of the lens barrel adjacent the rear end thereof. An aperture frame is detachably mounted on the camera body from behind the camera to define the exposure aperture. The flanks formed adjacent the rear end of the lens barrel or the frame receiving surface are effective to prevent individual frames of film from being subjected to undesirable vignetting. The aperture frame is mounted on the camera body from behind. A pair of masking plates is provided for panoramic photography. The rear side of the camera body is provided along vertically opposite edges of the barrel's rear end with these masking plates, and the aperture frame is mounted on the rear side of the camera body behind these masking plates.

9 Claims, 3 Drawing Sheets

CAMERA WITH NOVEL EXPOSURE FRAME

This application is a continuation of application Ser. No. 08/497,911, filed Jul. 3, 1995, now abandoned, which is a continuation of application Ser. No. 08/218,378, filed Mar. 28, 1994, now abandoned.

BACKGROUND OF THE INVENTION

1. Field of the Invention

The present invention relates to a camera having a novel exposure frame, particularly in a photographic camera having a lens barrel and a camera body molded integrally with each other, and further to such structure of the exposure frame which is suitable for a photographic camera adapted for panoramic photography by partially covering upper and lower edges of the exposure frame.

2. Description of the Related Art

To ensure that anyone can easily enjoy photography without the need for skill, photographic cameras can be provided with so-called focus switch-over devices by which the focal length of the objective can be switched between a long focal length (TELE) and a short focal length (WIDE), or a so-called variable focus device such as a zoom device allowing the focal distance to be continuously varied, have recently come into widespread use. These photographic cameras additionally include those provided with so-called auto-focusing devices allowing an object to be automatically brought into focus as the camera is directed toward the object.

Said variable focus devices require a power source for moving the objective along the optical axis and the mechanism transmitting a driving force from said power source to the lens barrel. Said auto-focusing devices require the power source and the other mechanism to drive the focusing lens for focusing. These driving sources and transmission mechanisms are usually arranged beside the lens barrel. To facilitate the operation of assembling these parts and the lens barrel into the camera body, it has been the practice to mold the camera body separately from the lens barrel and then to assemble the lens barrel thus incorporated with the predetermined parts, into the camera body.

To popularize cameras incorporating the various devices mentioned above, it is most important to provide such cameras at costs as low as possible. Accordingly, reduction of cost for parts as well as for manufacturing and, to meet such demand, the camera having the lens barrel and the camera body integrally molded from synthetic resin or the like, have already been developed. In addition, the camera must be miniaturized in order to make it portable and this requirement has been fulfilled by reducing the outer diameter of the lens barrel. The lens barrel is formed in its inner peripheral surface with a helicoid serving as the driving mechanism for the variable focus device. Reduction in the outer diameter of the lens barrel necessarily results in reduction of its inner diameter as well as the diameter of the helicoid.

The camera body has an exposure frame which is usually formed at the rear end of the lens barrel. Accordingly, if the inner diameter of the lens barrel is smaller than the inner dimension of the exposure frame, the individual frame of film might be subjected to a so-called vignetting effect during exposure. On the other hand, structural restrictions of the mold used to form the lens barrel integrally with the camera body make it difficult to form a mask adapted to define the frame. Therefore, attempts at integral molding of the lens barrel and the camera body have necessarily resulted in a structurally complicated exposure frame which has been disadvantageous for reduction of cost.

OBJECTS OF THE INVENTION

In view of this problem, it is a first object of the invention to provide a camera with an exposure frame so improved that the mask to define the frame can be incorporated into the camera even when the camera comprises the lens barrel and the camera body molded integrally with each other and any possibility of the vignetting effect appearing on the individual frame of film can be effectively avoided even when the lens barrel has a relatively small inner diameter.

The photographic cameras of popular type as have previously been mentioned include cameras adapted to be selectively operated in the normal photography mode with the individual frame of film of full-size exposed, or in the panoramic photography mode with upper and lower areas in the individual frame of film masked. In the case of 35 mm film, for example, the individual frame presents a full-sized picture of 24 mm×36 mm in the normal photography mode and presents an oblong picture corresponding to said full-sized picture with its upper and lower areas masked, for example, of approximately 16 mm×36 mm in the panoramic photography mode. In this manner, the picture sizes suitable for a particular object to be photographed, for example, a close-range view, a distant view such as mountains or a wide range view can be obtained by selecting an appropriate mode of photography.

The arrangement for said panoramic photography is well known, in which rotatable masking plates are provided in front of the aperture and these plates are advanced into the optical path so as to cover upper and lower areas of the exposure frame. Conventionally, such plates have been rotatably assembled into upper and lower edges of the exposure frame from the front of the camera body, followed by mounting the lens barrel such as the stationary lens barrel on the camera body from the front.

However, when it is desired to assemble these plates with upper and lower edges of the exposure frame from the front of the camera body which has been molded integrally with the lens barrel, the side wall of said lens barrel must be formed with through-holes for insertion of the masking plates and, after insertion of the plates, these through-holes must be stopped up in order to shield light which otherwise would enter the lens barrel. Such an arrangement results in a complicated structure and makes effective cost reduction difficult.

In view of this problem, it is a second object of the invention to provide a camera with an exposure frame so improved that the masking plates for panoramic photography can be easily assembled even when the camera comprises the lens barrel and the camera body molded integrally with each other.

SUMMARY OF THE INVENTION

The objects set forth above are achieved, according to the invention, by an exposure frame at the rear end of a lens barrel in a photographic camera having said lens barrel and a camera body molded integrally with said lens barrel, by structure comprising flanks formed by a pair of vertical planar surfaces parallel to the optical axis on inner surfaces of a recieving surface at locations that define four corners of the exposure frame so as to extend axially outward from the inner surface of the lens barrel adjacent the rear end thereof, and an aperture frame detachably mounted on the camera body from behind the camera to define the exposure frame.

These objects are also achieved, according to the invention, by an exposure frame defined at the rear end of a lens barrel in a photographic camera of the normal/panoramic photography mode switch-over type having a lens barrel and a camera body molded integrally with said lens barrel, the frame comprising masking blades detachably and rotatably mounted on the rear side of the camera body so as to cover the rear end of said lens barrel partially along its periphery, an aperture frame detachably mounted on the camera body from behind the camera to define the exposure aperture, and said masking plates being supposed by said aperture frame.

These objects are also achieved, according to the invention, by an exposure frame at the rear end of a lens barrel in a photographic camera of the normal/panoramic photography mode switch-over type having said lens barrel and a camera body molded integrally with said lens barrel, said structure comprising, flanks formed by a pair of vertical planar surfaces parallel to the optical axis on inner surfaces of a frame receiving surface at locations that define four corners of the aperture so as to extend axially outward from the inner surface of the lens barrel adjacent the rear end thereof, masking plates detachably and rotatably mounted on the rear of the camera body so as to cover the rear end of said lens barrel partially along its periphery, an aperture frame detachably mounted on the camera body from the rear of the camera to define the exposure aperture, and said plates being supported by said aperture frame.

Preferably, inner side edges of said aperture frame are aligned with said flanks or said aperture frame is provided with bearing ribs adapted to support said masking plates.

Said flanks formed adjacent the rear end of said lens barrel eliminate portions which otherwise would cause a vignetting effect on the individual frame of film. The exposure aperture is defined by the aperture frame incorporated into the camera from behind the camera body.

When it is desirable to incorporate said masking plates for panoramic photography, this incorporation may be performed from behind the camera body. More specifically, these plates may be assembled into the rear end of the lens barrel so as to extend along upper and lower edges thereof from behind the camera body and then the aperture frame may be put on the masking plates from behind these plates.

BRIEF DESCRIPTION OF THE DRAWINGS

The camera with novel exposure frame according to the invention will be described in more detail by way of an example given with reference to the accompanying drawings, in which.

DETAILED DESCRIPTION OF THE PREFERRED EMBODIMENT

Figure 1:
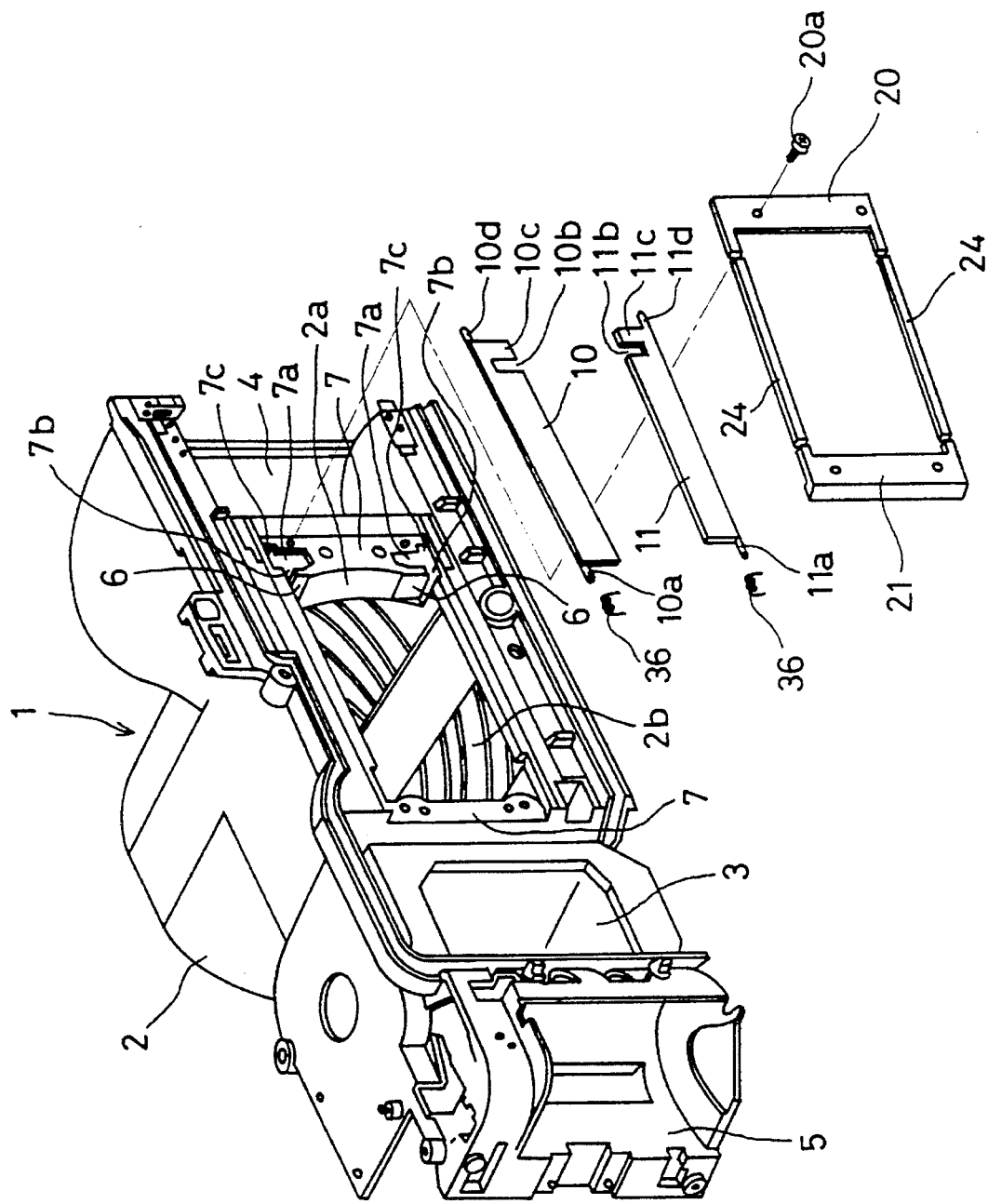
FIG. 1 is an exploded perspective view of a camera body as viewed from behind, showing the exposure frame according to the invention which is ready for mounting masking plates for panoramic photography and aperture frames on a rear side of the camera body.

Referring to FIG. 1 schematically showing, in a perspective view, the rear side of a camera body, this camera body 1 is centrally provided with a stationary lens barrel 2 formed by synthetic resin or the like integrally with the camera body 1. On opposite sides of this stationary lens barrel 2 of the camera body 1 are a cassette chamber 3 to be loaded with a film cassette and a spool chamber 4 adapted to support a spool (not shown) for successively taking up film. A battery chamber 5 is next to the cassette chamber 3.

The inner space of said stationary lens barrel 2 extends to and opens at the rear end of the camera body 1 so as to define a rectangular window serving as an aperture in said rear end of the camera body 1. The stationary lens barrel 2 has its inner peripheral surface within said window. The inner peripheral surface is formed with a helicoid 2b extending from a front end to a position adjacent a rear end of the stationary lens barrel 2 so that a helicoid formed on the outer peripheral surface of a movable lens barrel (not shown) movably received by said stationary lens barrel 2 and holding an objective may be engaged with said helicoid 2b to be moved along the optical axis as said movable lens barrel is rotated about said optical axis. Adjacent the rear end of the inner peripheral surface of the lens barrel are flanks 6 on frame receiving surfaces 7 formed at positions corresponding to four corners of said rectangular aperture. These flanks 6 lie in vertical planes parallel to the optical axis of said objective and extend beyond the inner peripheral surface 2a of the frame receiving surfaces 7.

Figure 2:
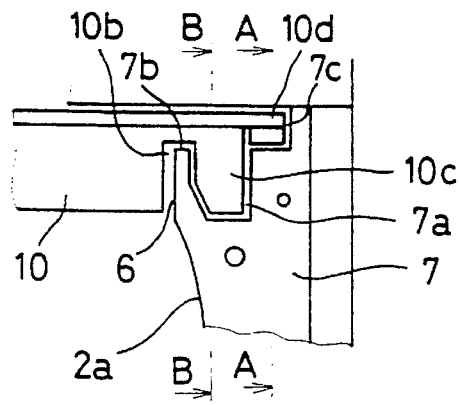
FIG. 2 is a rear view illustrating the mechanism by which the masking plates are supported and the aperture frames are mounted.

The stationary lens barrel 2 is formed slightly ahead of its rear end with the frame receiving surfaces 7 lying in a plane extending transversely of the optical axis. The frame receiving surface 7 formed adjacent the spool chamber 4 is formed at vertically opposite ends thereof with through-holes 7a, which are substantially trapezoidal as will be seen in FIGS. 1 and 2, and the rear side of the camera body 1 communicates with a lateral side of the stationary lens barrel 2 through said through-holes 7a. The frame receiving surface 7 formed adjacent the spool chamber 4 is formed at vertically opposite ends thereof with notches 7b through which said through-holes 7a communicate with the inner side of the stationary lens barrel 2 at its rear portion. Symmetrically to the respective notches 7b with respect to the respective through-holes 7a, there are provided notches 7c serving as bearings. On the other hand, the frame receiving surface 7 formed adjacent the cassette chamber 3 is formed at vertically opposite ends thereof with notches (not shown) extending from the inner peripheral surface 2a of the frame receiving surface 7 by an appropriate length.

As will be seen in FIG. 1, the exposure frame is provided at vertically opposite ends with masking plates 10, 11 used for panoramic photography. These plates 10, 11 function during panoramic photography to cover a portion of an individual film frame adjacent vertically opposite ends thereof and thereby to prevent such portions from being exposed. For normal photography, these plates 10, 11 are retracted from the exposure aperture. Bearing pins 10a, 11a extend outward from respective ends of the plates 10, 11. The plates 10, 11 are formed at the other ends thereof with respective notches 10b, 11b, and between these notches 10b, 11b and said other ends are provided input plate portions 10c, 11c from which bearing pins 10d, 11d extend outward. Upon insertion of the masking plates 10, 11 into the camera body 1 from behind, said bearing pins 10a, 11a are received by notches (not shown) formed adjacent the cassette chamber 3, said bearing pins 10d, 11d are received by said notches 7c and said input plate portions 10c, 11c are located so as to cover the respective said through-holes 7a.

Figure 3:
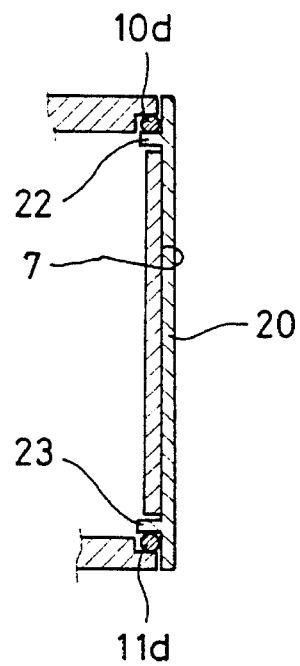
FIG. 3 is a sectional view taken along line A—A in FIG. 2, showing the aperture frames mounted on said mechanism.

The aperture frame is put on masking plates 10, 11 from behind, as will be seen in FIG. 1. This aperture frame is actually divided into right and left frames 20, 21 each being formed by a substantially rectangular plate. Specifically, these aperture frames 20, 21 are put on said frame receiving surface 7 so that respective inner side edges of said aperture frame 20, 21 are aligned with said flanks 6 and therefore vertically intermediate portions of these inner side edges are located inside the inner peripheral surface 2a of the frame receiving surface 7. Said aperture frames 20, 21 are formed on their front surface at vertically opposite ends with bearing ribs 22, 23 adapted to be inserted into said notches 7c, as these aperture frames 20, 21 are put on said frame receiving surface 7, and to support said bearing pins 10a, 10d, 11a, 11d of the masking plates 101, 11, as shown in FIG. 3.

As shown by FIG. 1, the exposure frame is provided along upper and lower edges with film rails 24 adhesively fixed thereto so that these film rails span the aperture frames 20, 21. The roll of film loaded into said cassette chamber 3 is to be pulled out from the cassette and guided along the film rails 24 into the spool chamber 4.

Figure 4:
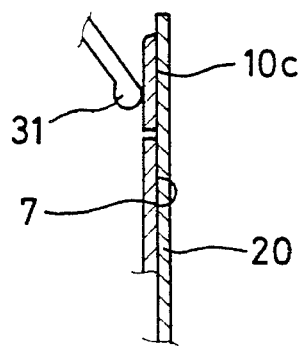
FIG. 4 is a sectional view taken along line B—B in FIG. 2, showing the aperture frames mounted on said mechanism.
Figure 5:
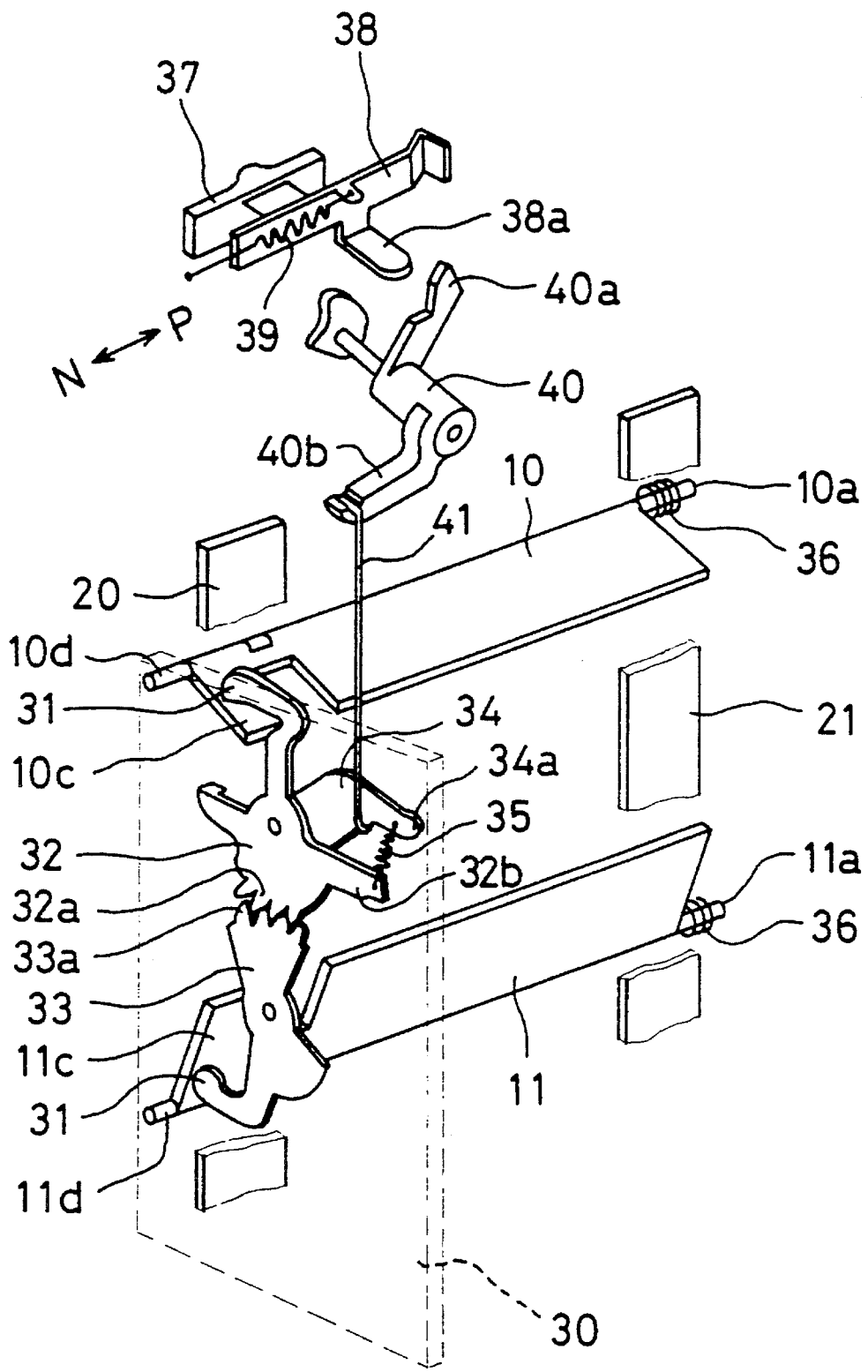
FIG. 5 is a perspective view schematically showing construction of a mechanism to drive the masking plates for panoramic photography.

Referring to FIG. 4, a masking plate driving mechanism includes a pair of driving rods 31 of which forward ends bear against the respective front surfaces of the input plate portions 10c, 11c associated with said plates 10, 11, respectively. This masking plate driving mechanism will be described with reference to FIG. 5, showing this driving mechanism in a perspective as viewed from the front of the camera. As shown, said driving rods 31 are formed integrally with upper and lower portions of upper and lower driving plates 32, 33, respectively, so as to extend rearward from the respective driving plates 32, 33. These upper and lower driving plates 32, 33 are supported by a base plate 30 for panoramic photography and are rotatable about respective shafts extending transversely of the optical axis. These driving plates 32, 33 partially define sector wheels having teeth 32a, 33a, respectively. Mutual engagement o these teeth 32a, 33a causes one of said driving plates 32, 33 to be rotated as the other driving plate is rotated. An arm 32b extends forward from the upper driving plate 32 and an input arm 34a also extends forward from a switching plate 34 which is rotatably supported on the same shaft as that on which said upper driving plate 32 is rotatably supported. A tension spring 35 is suspended between said arm 32b and said input arm 34a so that said arm 32b and said input arm 34a are normally pulled toward each other under a restoring force of said tension spring 35.

Referring to FIGS. 1 and 5, return springs 36 comprising torsion coil springs are mounted about respective said bearing pins 10a, 11a of the masking plates 10, 11 both extending toward the cassette chamber 3 so that the plates 10, 11 are biased by the restoring force of these return springs 36 to return from the position for panoramic photography to the position for normal photography.

Referring to FIG. 5, the camera body 1 is provided at an appropriate location with a manually operated switching knob 37 adapted to be slidably movable transversely of the optical axis, and, in front of this switching knob 37 a switching lever 38 operatively associated with said switching knob 37. The switching lever 38 is normally biased under the restoring force of a return spring 39 comprising a coil tension spring so that said switching knob 37 may be quickly moved toward the position for normal photography as indicated by an arrow N in FIG. 5. A switching arm 38a extends forward from a lower end of the switching lever 38 and a forward end of this switching arm 38a can be brought into or out of engagement with an input arm 40a of a switching lever 40. The switching lever 40 is rotatable around an axis parallel to the optical axis and its output arm 40b extending in a direction opposite to the input arm 40a is connected with the input arm 34a of said switching plate 34 by means of wire 41. It should be understood that, referring to FIG. 5, switching knob 37 may be slidably moved in the direction as indicated by an arrow P to switch the camera into the panoramic mode and in the direction as indicated by the arrow N to switch the camera into the normal mode.

The embodiment of the camera exposure frame constructed according to the invention as has been described with reference to the accompanying drawings operates in a manner as will now be described.

The masking plates used for panoramic photography are assembled into the exposure frame of the camera body 1 having the stationary lens barrel 2 molded integrally therewith. More specifically, the return springs 36 are mounted around the respective bearing pins 10a, 11a of the plates 10, 11 and said bearing pins 10a, 11a as well as bearing pins 10d, 11d are positioned in notches 7c with respective input plate portions 10c, 11c of the masking plates 10, 11 positioned in the associated through-holes 7a of the frame receiving surface 7.

Then, the film rails 24 are fixed to the exposure frame along the upper and lower edges thereof, for example by means of adhesive. The aperture frames 20, 21 are placed on the frame receiving surface 7 and fixed thereto, for example by means of screws 20a (FIG. 1). Aperture frames 20, 21 are substantially rectangular and their inner side edges are aligned with the associated pairs of flanks 6, thus defining a substantially rectangular aperture. To position the aperture frames 20, 21 on the frame receiving surface 7, bearing ribs 22, 23 are inserted into the associated notches 7c formed in the frame receiving surface 7 and bearing pins 10a, 11a, 10d, 11d of the respective plates 10, 11 are supported by said bearing ribs 22, 23.

The operation of switching between the normal photography mode and the panoramic photography mode will now be described. From the position corresponding to the normal photography mode, the switching knob 37 is slid in the direction indicated by the arrow P in FIG. 5 and thereby the switching lever 38 is slidably moved in the same direction in order to ensure that the switching arm 38a pushes the input arm 40a of the switching lever 40 and thereby rotates switching lever 40 together with the output arm 40b clockwise as viewed in FIG. 5. Rotation of this output arm 40b causes the input arm 34a of the switching plate 34 to be pulled upward and thereby causes switching plate 34 to be rotated counterclockwise as viewed in FIG. 5. As the input arm 34a is pulled upward, the arm 32b of the upper driving plate 32 connected to input arm 34a by the tension coil spring 35 is also pulled upward and, in consequence, upper driving plate 32 is rotated counterclockwise as viewed in FIG. 5. As a result, the driving rod 31 of upper driving plate 32 is also rotate din the same direction, pushing the input plate portion 10c of the masking plate 10 so that plate 10 is rotated clockwise as viewed in FIG. 5 against the restoring force of the return spring 36 and covers the area of the aperture along the upper edge thereof as shown by FIG. 4. Such rotation of upper driving plate 32 causes the lower driving plate 33 to be rotated clockwise as viewed in FIG. 5, since the teeth 33a of the lower driving plate 33 are in engagement with the teeth 32a of upper driving plate 32. Consequently, the rod 31 of lower driving plate 33 is also rotated in the same direction, rotating the masking plate 11 counterclockwise as viewed in FIG. 5, so the area of the aperture along the lower edge thereof is covered by plate 11. In this way, the upper and lower areas of the aperture are covered by plates 10, 11, respectively, so that only the film in an individual frame limited for the panoramic photography will be exposed.

Switching knob 37 may be slidably moved in the direction indicated by the arrow N in FIG. 5 in order to switch the camera from the panoramic photography mode to the normal photography mode. For this operation, switching knob 37 can be smoothly moved, since switching knob 37 is normally biased by the restoring force of the return spring 39. Sliding movement of switching knob 37 causes the switching lever 38 to be slid in the same direction and the switching arm 38a thereof is disengaged from the input arm 40a of the switching lever 40. Consequently, switching arm 38a is released from restriction by switching lever 40 and the switching plate 34 connected with the output arm 40b of switching lever 40 by the wire 41 is also freed, whereupon upper switching plate 32 and lower switching plate 33 connected with upper switching plate 32 by teeth 32a and 33a are freed, since switching plate 34 is normally biased by the coil tension spring 35 toward upper driving plate 32. As a consequence, the plates 10, 11 which have been restricted by upper switching plate 32 and lower switching plate 33, respectively, are released from restriction by these switching plates 32, 33 and rotated under the restoring force of return spring 36 from their positions in the panoramic photography mode to their positions in the normal photography mode. Such rotation of these plates 10, 11 causes the upper and lower areas of the aperture to be uncovered and, as a result, all the film in an individual frame will be exposed.

As will be readily appreciated from the foregoing description, the structure of the camera with novel exposure frame, according to the invention, has a stationary lens barrel molded integrally with the camera body and aperture frames which are detachably mounted on the rear side of the camera body. This allows the flanks to be defined at four corners of the frame receiving surface adjacent the lens barrel's rear end by vertical planes parallel to the optical axis. Accordingly, the vignetting effect on the plane of the film can be minimized even when the inner diameter of the lens barrel is relatively small.

The invention allows the inner diameter of the stationary lens barrel and therefore the diameter of the helicoidal screw also to be reduced without any significant adverse influence, so the outer diameter of the movable lens barrel or the like received by the stationary lens barrel can be correspondingly reduced and thereby miniaturization of the camera is facilitated.

Furthermore, the invention allows the masking plates for panoramic photography to be assembled into a camera of normal/ panoramic mode switchable type having the camera body and the lens barrel integrally molded from synthetic resin, from the rear of the camera. This feature not only simplifies the construction but also facilitates the operation of assembling in comparison to the conventional construction in which the masking plates are assembled into the camera from the front of the camera. In consequence, the cost of camera parts as well as the cost for assembly can be reduced to provide the camera at a reasonably low cost.

What is claimed is:

1. A camera comprising an integrally molded camera body and lens barrel, an aperture frame detachably mounted on a rear of said camera body to define an exposure frame, said lens barrel having a smaller inner diameter than a diagonal dimension of said exposure frame, flanks disposed in a pair of vertical planar surfaces parallel to an optical axis of said lens barrel and extending beyond arcuate inner surfaces of a frame receiving surface at locations defining four corners of the aperture frame adjacent a rear end of said lens barrel, and masking plates rotatably mounted on the rear of the camera body and supported by said aperture frame so as to cover the rear end of said lens barrel partially along upper and lower sides thereof, said plates comprising notches shaped to receive said flanks, and being vertically swingable selectively to adjust the camera for normal photography or for panoramic photography, said flanks thereby preventing a vignetting effect caused by said lens barrel having said smaller diameter than said diagonal dimension of said exposure frame.

2. A camera according to claim 1, wherein said aperture frame is provided with bearing ribs adapted to support said masking plates.

3. A camera according to claim 1, wherein said aperture frame comprises right and left substantially rectangular plates on opposite horizontal sides of said exposure aperture.

4. A camera according to claim 1, wherein inner side edges of said aperture frame are alinged with said flanks.

5. A camera according to claim 4, wherein said aperture frame is provided with bearing ribs adapted to support said masking plates.

6. An aperture structure comprising an integrally molded camera body and lens barrel wherein an inner diameter of the lens barrel is smaller than a diagonal dimension of said aperture structure, the aperture structure being arranged at a rear end of the lens barrel, the aperture structure comprising flanks disposed in a pair of vertical planar surfaces parallel to an optical axis of said lens barrel and extending beyond arcuate inner surfaces of a frame receiving surface at places corresponding to four corners of the aperture structure, said flanks being notched to align with said four corners, said flanks thereby preventing a vignetting effect caused when said lens barrel has a smaller inner diameter than said diagonal dimension of said aperture structure.

7. An aperture structure as defined in claim 6, wherein said aperture structure comprises an aperture frame detachably mounted on the rear of the camera body to define an exposure aperture.

8. A camera according to claim 7, wherein inner side edges of said aperture frame are aligned with said flanks.

9. A camera according to claim 7, wherein said aperture frame comprises right and left substantially rectangular plates on opposite horizontal sides of said exposure aperture.

* * * * *